(12) United States Patent
Cooper

(10) Patent No.: US 6,325,506 B1
(45) Date of Patent: Dec. 4, 2001

(54) INTERCHANGEABLE EYEGLASS LENS SYSTEM

(76) Inventor: George F. Cooper, 2411 Crofton La., Crofton, MD (US) 21114

( * ) Notice: Subject to any disclaimer, the term of this patent is extended or adjusted under 35 U.S.C. 154(b) by 0 days.

(21) Appl. No.: 09/690,984

(22) Filed: Oct. 18, 2000

(51) Int. Cl.$^7$ .................................................. G02C 9/00
(52) U.S. Cl. ................................................ 351/47; 351/107
(58) Field of Search ................................. 351/47, 48, 57, 351/58, 44, 103, 107

(56) References Cited

U.S. PATENT DOCUMENTS

| D. 238,303 | 12/1975 | Leblanc | D16/304 |
|---|---|---|---|
| D. 336,308 | 6/1993 | Shelton | D16/123 |
| D. 391,594 | 3/1998 | Huh | D16/304 |
| D. 400,556 | 11/1998 | Friedman | D16/330 |
| D. 411,854 | 7/1999 | Friedman | D16/330 |
| 1,899,905 | 2/1933 | Uhlemann | 351/47 |
| 3,876,295 | 4/1975 | Loughner | 351/47 |
| 4,952,043 * | 8/1990 | Werner et al. | 351/47 |
| 4,955,707 | 9/1990 | Gazeley | 351/47 |
| 5,100,224 | 3/1992 | Terrasi | 351/47 |
| 5,164,749 | 11/1992 | Shelton | 351/47 |
| 5,258,786 | 11/1993 | Penrod | 351/47 |
| 5,321,443 * | 6/1994 | Huber et al. | 351/47 |
| 5,335,025 | 8/1994 | Wang | 351/47 |

FOREIGN PATENT DOCUMENTS

0424116-A2 * 4/1991 (EP) ........................................ 351/47

* cited by examiner

Primary Examiner—Huy Mai
(74) Attorney, Agent, or Firm—Rosenberg, Klein & Lee

(57) ABSTRACT

An interchangeable eyeglass lens system (10) is provided wherein the interchangeable eyeglass lens system (10) includes a central support member (20) having a clip means (30) mounted thereon for attachment to a standard pair of eyeglasses (12). The central support member (20) has first and second lateral projections (22 and 24) projecting therefrom. Additionally, first and second lens retaining members (52 and 54) are movably mounted on first and second lateral projections (22 and 24) so that the first and second lens retaining members (52 and 54) may be positioned along the length of the central support member (20) so that the interchangeable eyeglass lens system (10) may be mounted on a pair of eyeglasses (12) of any lateral width.

19 Claims, 6 Drawing Sheets

INTERCHANGEABLE EYEGLASS LENS SYSTEM

BACKGROUND OF THE INVENTION

1. Field of the Invention

The present invention directs itself to eyeglass systems. In particular, the present invention directs itself to a device which allows for placement and removal of an auxiliary pair of glasses or optical lenses over standard eyeglasses. Still further, this invention relates to an auxiliary optical lens which may be simply removed and inserted over and in conjunction with standard eyeglasses.

In particular, the subject invention relates to a central support member having a pair of lens retaining members mounted thereon. The lens retaining members are adjustably positionable along the length of the central support member to allow the interchangeable eyeglass lens system to be mounted on a variety of eyeglasses having differing dimensions.

The subject invention directs itself to an interchangeable eyeglass lens system which may be used for a variety of purposes including aesthetic purposes where differing contours and tinted optical lenses are placed in coupled relation to standard eyeglasses. Still further, the subject invention directs itself to a safety device whereby the interchangeable eyeglass lens system includes a safety glass for plastic type composition which is mounted in detachable manner to standard eyeglasses. Additionally, the subject invention is directed to an interchangeable eyeglass lens system which permits differing optical lenses to be mounted thereto which have differing optical characteristics and may be interchanged therewith.

2. Prior Art

Additional clip-on optical filters for conventional eyeglasses are well-known in the art. In general, such prior art auxiliary clip-on sunglasses include a frame member and a spring-biased clip for attachment to a pair of eyeglasses. In many instances, the problems of such prior art clip-on sunglass accessories are that the frames for the clip-on lenses are sized so as to only fit on eyeglasses of a particular dimension. Thus, the auxiliary lens systems are not easily applied to a variety of eyeglasses. Further, such prior art systems also do not allow for the interchangeability of the auxiliary optical filters. In order to receive light filtering with different properties, the entire lens system, including the frame member, must be replaced, rather than just replacing the additional optical lens itself.

One such prior art lens system is shown in U.S. Pat. No 1,899,905. This reference is directed to a glare dimmer attachment. The glare dimmer attachment utilizes a strip of metal folded upon itself to receive and hold in place the auxiliary lens means. The metal strip does not include means for adjusting its lateral width to the lateral width of the pair of eyeglasses. Further, the auxiliary optical lens is held permanently in place with respect to the metal strip holder, thus not allowing for the interchangeability of other optical means.

Another such prior art optical accessory is shown in U.S. Pat. No. 4,955,707. This reference is directed to a pivoting optical accessory for use with a pair of spectacles. This system utilizes an elongated, resilient metallic bar to which is secured the optical elements by the use of permanent plastic rivets. The metallic bar is not laterally adjustable and the optical elements are held permanently to the metallic bar holding element.

U.S. Pat. No. 5,258,786 shows a prior art lens system having a filtering visor permanently affixed to the clip means. The pivotal visor does not include an adjustable frame member, nor is the filtering visor interchangeable.

U.S. Pat. No. 3,876,295 shows a prior art auxiliary sunglasses system directed to a pair of clip-on eye protectors. This system includes a bridge member to which the lens means are affixed by permanent securing rivets. The bridge member is not adjustable along its lateral width, nor are the lens means interchangeable with other lens means.

Another prior art sunglasses system is shown in U.S. Pat. No. 5,164,749. This reference is directed to a clip for mounting sunglass lenses on spectacles. This system includes a single-piece support element having a non-adjustable, constant length. Affixed to the support element is a lens carrying means to which the lenses are affixed by adhesives, screws, pins, or other permanent means. Thus, this system is not laterally adjustable to fit on any pair of eyeglasses, nor does it allow for the interchangeability of the lenses.

None of the prior art provides for a combination of elements forming an interchangeable eyeglass lens system which may be laterally adjusted for mounting on eyeglasses of any lateral dimension. Additionally, none of the prior art Patents provide for an eyeglass lens system having interchangeable optical elements.

SUMMARY OF THE INVENTION

The present invention provides for an interchangeable eyeglass lens system which is adjustable for mounting on a pair of eyeglasses of any lateral width. The interchangeable eyeglass lens system includes a central support member having first and second lens retaining members movably mounted thereon. An optical lens is removably received within a central support slot formed on the central support member and within first and second lens retaining slots formed on the first and second lens retaining members.

Thus, the interchangeable eyeglass lens system may be laterally adjusted to fit on a pair of eyeglasses of any lateral width. Additionally, the lens means may include a plurality of lenses having different optical characteristics and may be interchanged for use with the interchangeable eyeglass lens system.

Additionally, the interchangeable eyeglass lens system includes a clip means for removable attachment of the eyeglass lens system to a pair of eyeglasses.

It is a principal objective of the subject interchangeable eyeglass lens system to provide additional optical protection which may be mounted on a pair of eyeglasses of any lateral width.

It is a further objective of the interchangeable eyeglass lens system to provide for a plurality of optical elements having different optical characteristics which may be interchanged with one another.

It is a further objective of the subject invention to provide an interchangeable eyeglass lens system which may be removably mounted on a pair of eyeglasses.

It is a further objective of the subject invention concept to provide an interchangeable eyeglass lens system having an arcuate optical optical lens means providing for additional protection from external environmental hazards.

DESCRIPTION OF THE PREFERRED EMBODIMENTS

Figure 1:
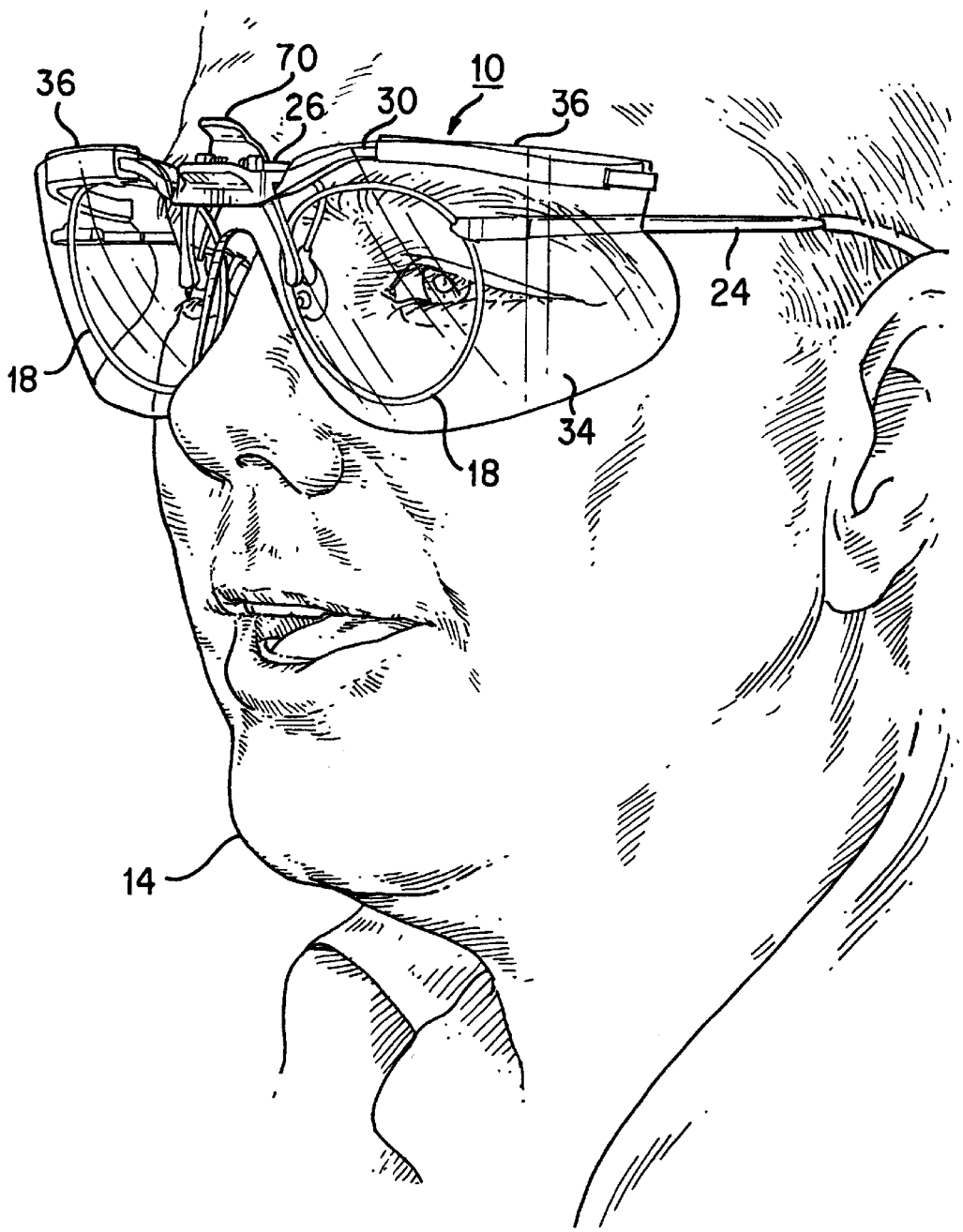
FIG. 1 is a perspective view of the interchangeable eyeglass lens system mounted on a pair of eyeglasses and worn by a wearer.
Figure 2:
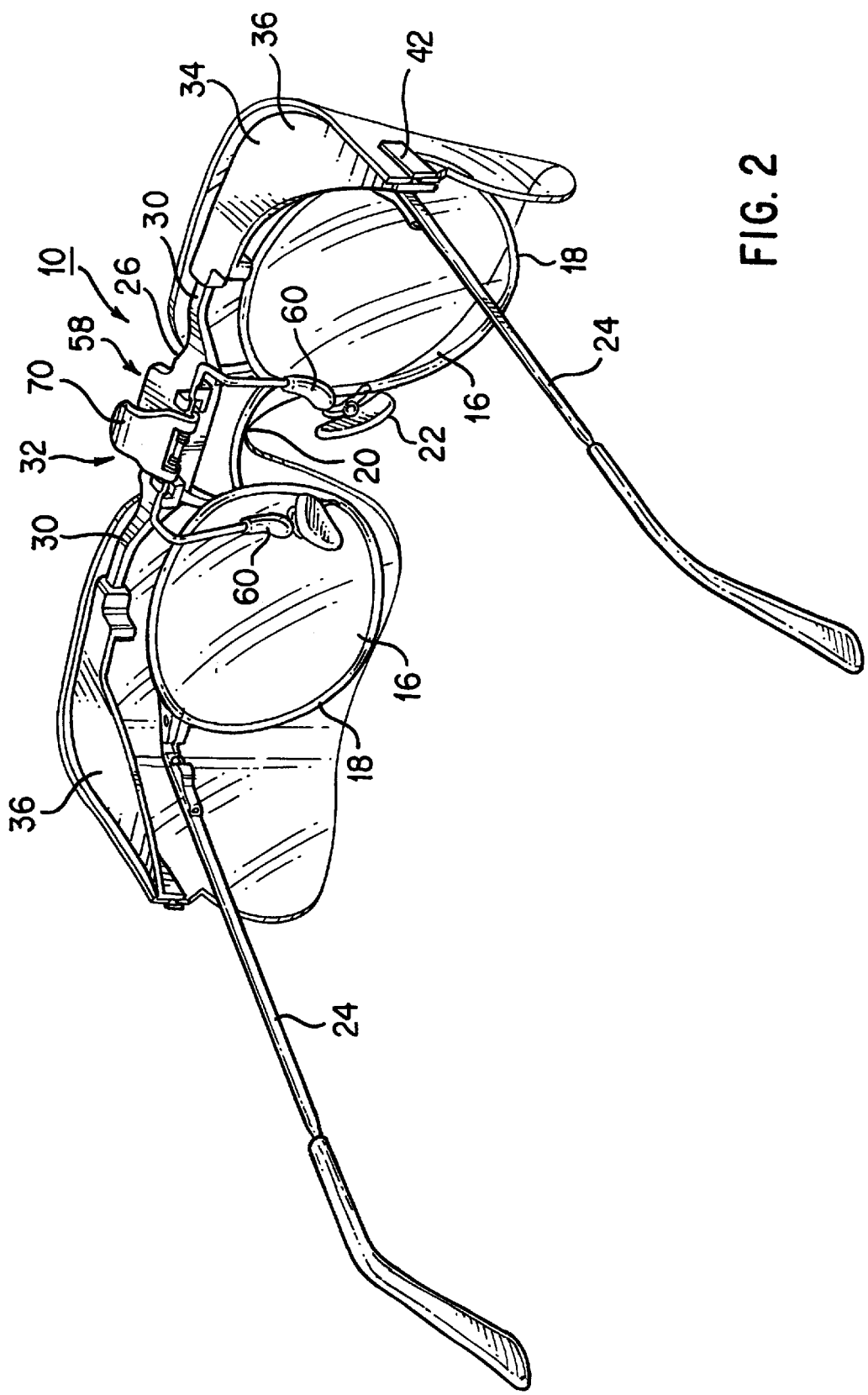
FIG. 2 is a rear view of the interchangeable eyeglass lens system mounted on a pair of eyeglasses.

Referring now to FIGS. 1–4, there is shown interchangeable eyeglass lens system 10 adapted to be mounted on a pair of eyeglasses 12 and worn by a user 14 for purposes of added optical protection, aesthetic enhancement, or providing variations in the color of light passing therethrough which can be varied at the option of the user. Interchangeable eyeglass lens system 10 is particularly adapted, as will be seen in following paragraphs, to permit user or wearer 14 to change covering lenses in a simple, efficient and minimum time consuming manner.

Eyeglasses 12 may be of standard construction including a pair of eyeglass lenses 16 secured within eyeglass frames 18 having an eyeglass bridge 20 and possibly nose pads 22. Eyeglasses 12 include temple members 24 for fitting engagement with the wearer 14 in the normal fashion. Eyeglass lenses 16 may be formed of a transparent material and may be a prescription lens, safety glass, or otherwise formed of any transparent composition.

Figure 3:
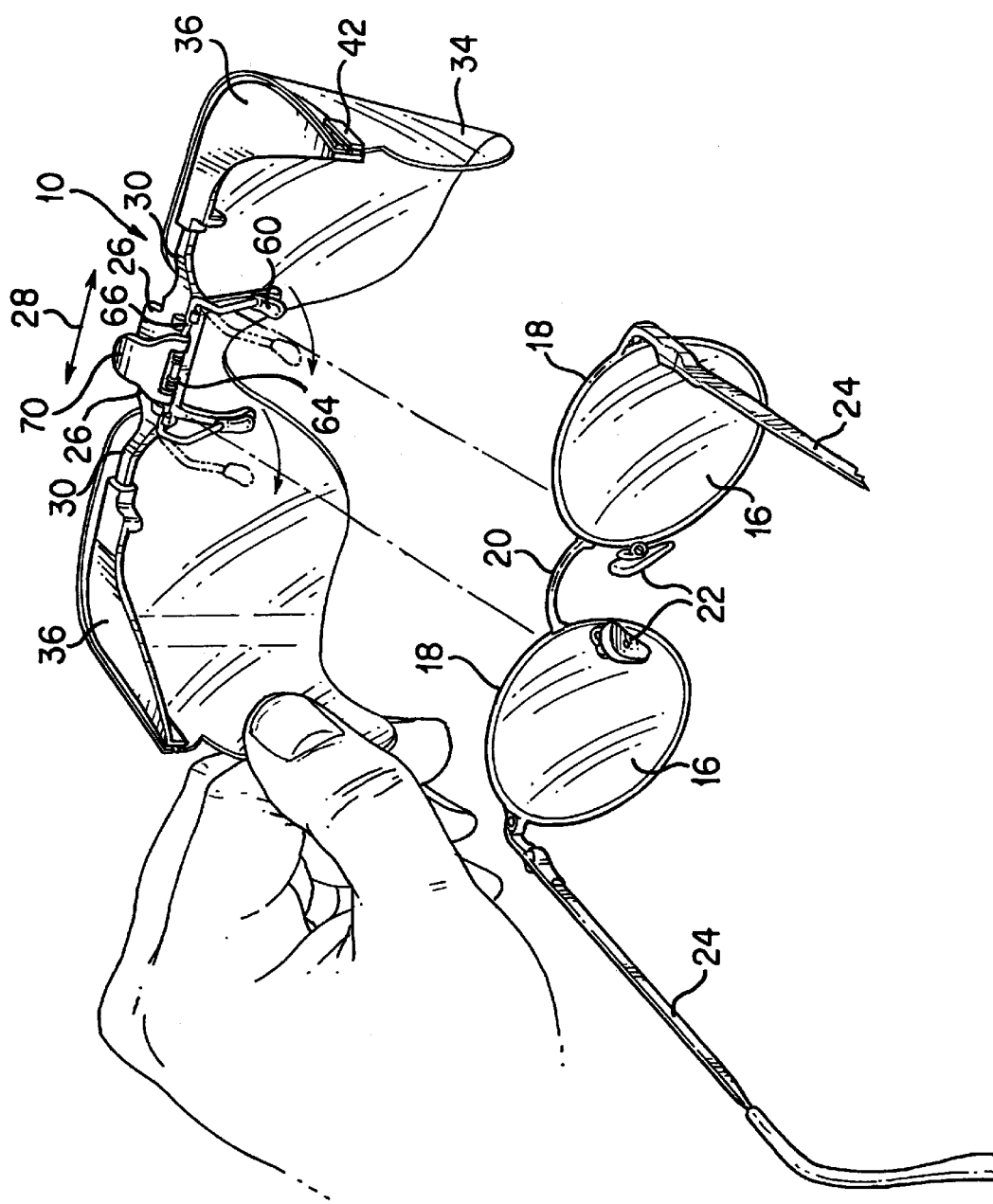
FIG. 3 is a rear view of the interchangeable eyeglass lens system removed from a pair of eyeglasses.
Figure 5:
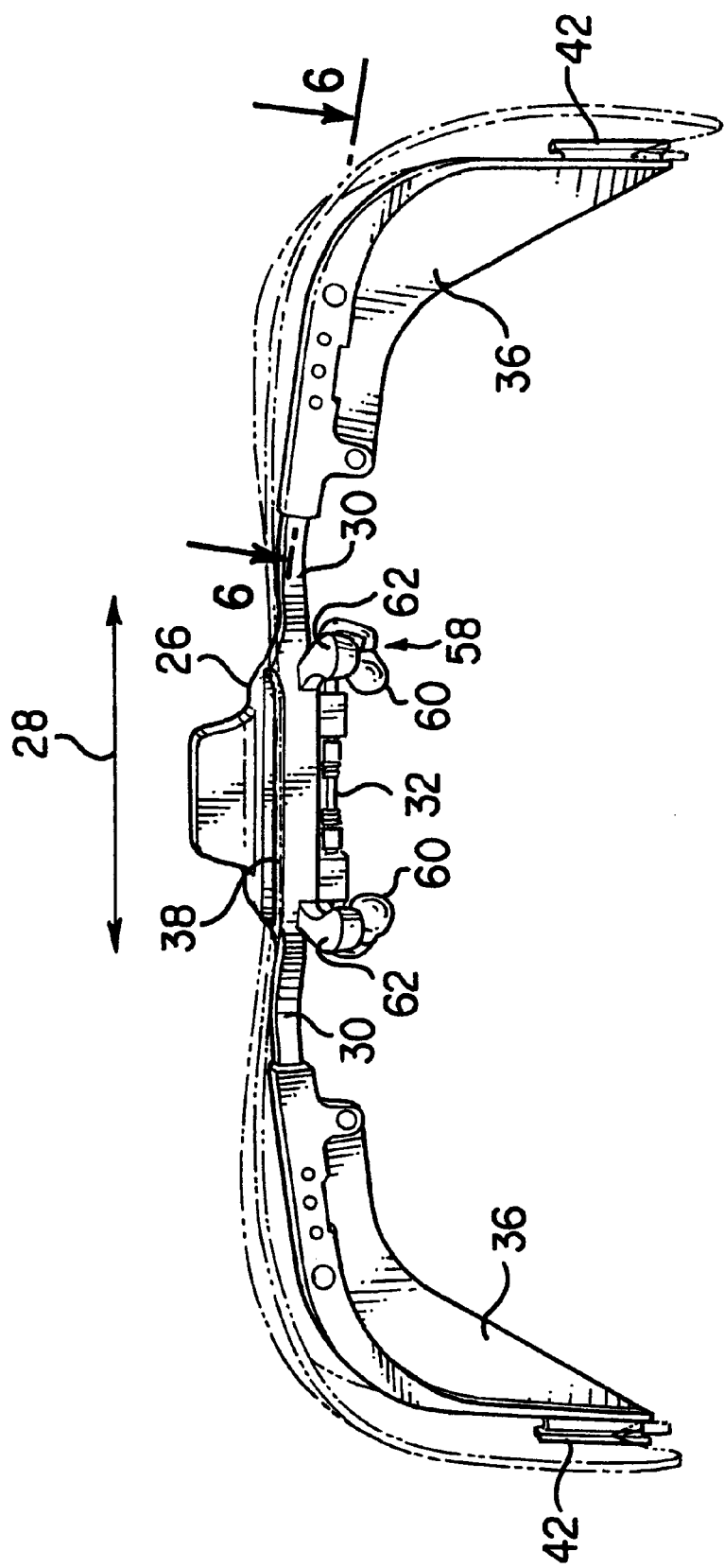
FIG. 5 illustrates the lens retaining members being variably positioned along the lateral projections of the central support member of the interchangeable eyeglass lens system.

Interchangeable eyeglass lens system 10 includes central support member 26 extending in generally lateral direction 28, as is shown in FIGS. 3 and 5.

Central support member 26 includes first and second lateral projection members 30 extending generally in lateral direction 28 and may be formed in one-piece formation with central support member 26. The combined central support member 26 and lateral projection members 30 may be formed of a plastic-like material or some like composition not important to the inventive concept as herein described with the exception that such composition is adaptable to accepting the force loadings applied thereto.

A pair of first and second lens retaining members 36 age are adapted to be slidably displaceable on lateral projection members 30. In this manner, first and second lens retaining members 36 slidingly engage and are releasably coupled to lateral projection members 30 in a manner which allows displacement therebetween. The displacement of first and second lens retaining members 36 further allows for adaptation of interchangeable eyeglass system 10 to a variety of sizes of optical lens 34 which cover eyeglass lenses 16 during use. optical lens 34 may be generally formed in one-piece formation and include a plastic-like or glass-like composition not important to the inventive concept as herein described with the exception that such be transparent to light passing therethrough and further is adapted to provide for differing optical lenses 34 of varied tints.

Optical lens 34 is generally contoured to be of a similar shape to the combined contour of central support member 26 and lateral projection members 30.

Figure 4:
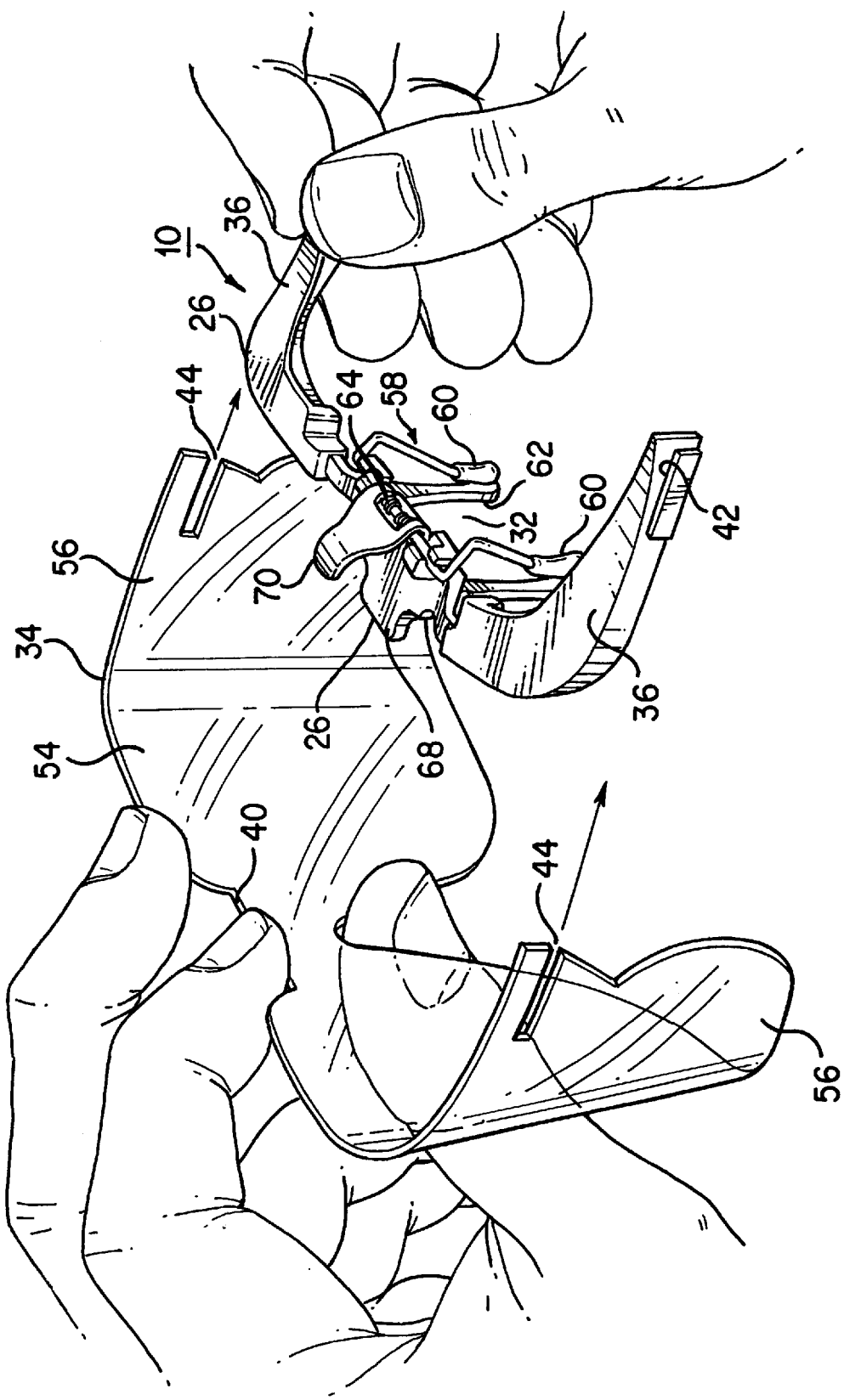
FIG. 4 shows the optical lens being removably attached to the central support member of the interchangeable eyeglass lens system.

Central support member 26 may include central support slot 38, shown in FIG. 5, which is adapted to receive central portion 40 of optical lens 34. As can be seen in FIG. 4, central portion 40 includes a recess section wherein optical lens 34 may be removably inserted within central support member slot 38. In this manner, added stabilization is provided for optical lens 34 when mounted to central support member 26.

Additionally, each of first and second lens retaining members 36 include lens retaining lugs for insert of optical lens 34 therein. Optical lens retaining lugs 42 are clearly seen in FIGS. 3, 4 and 5. Optical lens 34 includes recesses 44 which are inserted within lens retaining lugs 42. Lens retaining lugs 42 as can be seen are formed in one-piece formation with each of the first and second lens retaining members at opposing end portions thereof.

With the receipt of optical lens 34 within central support slot 38 and mounted on opposing lateral ends thereof to lens retaining lugs 42, there is provided a stabilized optical lens 34 which may be maintained in fixed position with respect to eyeglasses 12 during normal use by wearer 14.

Introduction of central portion 40 into central support slot 38 provides stabilization in lateral direction 28 while introduction of optical lens recesses 44 of first and second lens retaining members 36 within lens retaining lugs 42 provides stabilization of optical lens 34 in a direction substantially normal to lateral direction 28.

Figure 6:
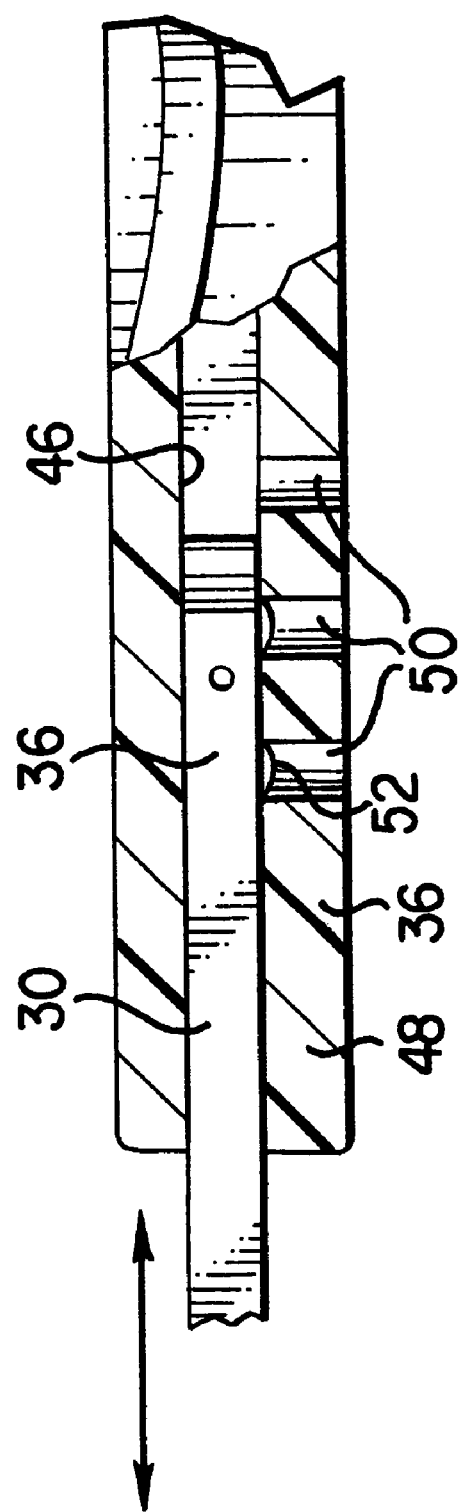
FIG. 6 is an enlarged cross-sectional view of the second lens retaining member movably mounted upon the second lateral projection of the central support member.

As clearly seen in FIG. 6, each of lens retaining members 36 includes a lateral projection member channel extending in lateral direction 28. Channel members 46 may be formed in a rectangular cross-sectional contour for insert of a respective lateral projection member 30. Lens retaining members 36 include bottom wall 48 which includes a plurality of openings 50 formed therethrough and in open communication with channel 46. Each of lateral projection members 30 includes a pair of positioning protrusions 52 which are insertable within openings 50 to maintain positional location of lateral projection members 30 with respect to each of first and lens retaining members 36. Protrusions 52 may be formed in a semi-circular contour and are of diameter substantially equal to the diameter of openings 50. In this manner, lateral projection members 30 may be slidably inserted within lateral projection member channels 46 and displaced to a positional location where positioning protrusions 52 are aligned with openings 50. When lateral projection members 30 are slidably inserted into channel 46 and alignment is made, protrusions 52 extend into openings 50 by a small amount which releasably lockingly engages lateral projection members 30 to each of first and second lens retaining members 36. Through use of a plurality of openings 50 and a plurality of protrusions 52, adjustment of the overall length of the combined lateral projection members 30 and the first and second lens retaining members 36 may be attained. This adjustment in lateral direction 28 allows for a plurality of sizes for interchangeable eyeglass system 10 in accommodation with specific optical lenses 34.

Thus, first and second lens retaining members 36 include lens retaining lugs 42 formed on opposing ends thereof as is clearly seen in FIG. 5. Each of the lens retaining members 36 includes channel 46 formed therein with channels 46 receiving the first and second lateral projection members 30 of central support member 26. First and second lens retaining members 36 are positionable with respect to first and second lateral projection members 30 to adjust interchangeable eyeglass lens system 10 in lateral direction 28 for accommodation of different sizes of eyeglasses 12.

In general, optical lens 34 includes optical lens central portion 54 and opposing optical lens side portions 56 formed in one piece formation. As can be clearly seen in FIG. 4, optical lens 34 includes the centrally frontally facing portion 54 combined with optical lens side portions 56 in an overall arcuate contour. In this manner, wearer 14 may be provided with additional protection from external environmental hazards. Still further, optical lens 34 may be formed of a thin plastic material which is flexible in nature to allow insertion into differing sizes of interchangeable eyeglass system 10.

Referring now to FIGS. 1–5, clip mechanism 32 includes first and second clamping mechanisms 58 for positioning central support member 26 on eyeglasses 12 and in particular with respective eyeglass lenses 16. Each of clamping mechanisms 58 includes clamp lug members 60 and 62. Clamp lug members 60 and 62 are displaceable each with respect to the other. Clamp lug members 62 are fixedly coupled to central support member 26 and extend downwardly therefrom, as is clearly shown in FIG. 4. Clamp lug members 62 bear against an inner face of optical lens 34 subsequent to optical lens 34 being inserted within central support slot 38.

Clamp lug members 60 are adapted to be biased and pivotally mounted to central support member 26 by spring member 64. In this manner, clamp lug members 62 may be pivotally displaced with respect to clamp lug members 60 while being mounted on central support member 26.

As can be seen in FIG. 3, each of clamp lug members 60 is joined in one piece formation to a corresponding clamp lug member 60 through a laterally directed rod 66. Spring member 64 is mounted on laterally directed rod member 66 and maintains a biasing force against clamp lug members 60 to force them into alignment and corresponding relation with clamp lug member 62.

By insertion of eyeglasses 12 and particularly eyeglass lenses 16 between clamp lug members 60 and 62, interchangeable eyeglass system 10 is removably coupled to eyeglasses 12.

Central support member 26 further includes appendage 68 which is formed generally in one-piece formation with the overall body of central support member 26. Displaceable bar 70 is fixedly coupled to laterally directed rod 66 in order that rotation of displaceable bar 70 causes a corresponding rotation of clamp lug members 60. In this manner, wearer 14 merely grasps displaceable bar 70 and appendage 68 between the fingers and by applying force can displace clamp lug member 60 from clamp lug member 62 to allow simple removal of interchangeable eyeglass lens system 10 from eyeglasses 12.

Thus, clip mechanism 32 is seen to include a mechanism for releasably grasping first and second eyeglass lenses 16.

Both of clamp lug members 60 and 62 are coupled to central support member 26, however, clamp lug member 60 is rotatable with respect thereto. Each of clamp lug members 60 and 62 are biased into contacting relationship each with respect to the other as has previously been described through the spring bias force applied by spring member 64.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, without departing from the spirit or scope of the invention as defined in the appended claims.

What is claimed is:

1. An interchangeable eyeglass lens system comprising:
a central support member having first and second lateral projections, said central support member having a clip means mounted thereon for releasable attachment to a pair of eyeglasses having first and second eyeglass lenses, said pair of eyeglasses having a lateral width, said central support member having a central support slot formed therethrough;
first and second lens retaining members, each of said lens retaining members having lens retaining lugs formed thereon, each of said lens retaining members having a channel formed therethrough, said channels receiving said first and second lateral projections of said central support member, respectively, said first and second lens retaining members being positionable with respect to said first and second lateral projections to adjust said interchangeable eyeglass lens system to said lateral width of said pair of eyeglasses; and,
an optical lens, said optical lens being removably received within said central support slot and said lens retaining slots.

2. The interchangeable eyeglass lens system as recited in claim 1 wherein said first and second lateral projections have positioning protrusions formed thereon.

3. The interchangeable eyeglass lens system as recited in claim 2 wherein said first and second lens retaining members have positioning holes formed therethrough, said positioning holes releasably engaging said positioning protrusions.

4. The interchangeable eyeglass lens system as recited in claim 1 wherein said clip means is spring biased.

5. The interchangeable eyeglass lens system as recited in claim 1 wherein said optical lens has an arcuate contour providing a wearer of said eyeglasses additional protection from external environmental hazards.

6. The interchangeable eyeglass lens system as recited in claim 1 wherein said optical lens is a colored optical filter.

7. The interchangeable eyeglass lens system as recited in claim 1 wherein each of said first and second lens retaining members has an arcuate contour.

8. The interchangeable eyeglass lens system as recited in claim 1 wherein said optical lens is formed of a resilient material.

9. The interchangeable eyeglass lens system as recited in claim 1 wherein said clip means includes means for releasably grasping said first and second eyeglass lenses.

10. The interchangeable eyeglass lens system as recited in claim 9 wherein said releasable grasping means includes at least one pair of clamp lug members coupled to said central support member.

11. The interchangeable eyeglass lens system as recited in claim 10 wherein said pair of clamp lug members are biased into contacting relationship each with respect to the other.

12. The interchangeable eyeglass lens system as recited in claim 11 wherein the pair of clamp lug members are spring biased into contacting relationship.

13. The interchangeable eyeglass lens system as recited in claim 12 wherein one of said clamp lug members is fixedly secured to said central support member.

14. The interchangeable eyeglass lens system as recited in claim 13 wherein one of said clamp lug members is pivotally mounted to said central support member.

15. The interchangeable eyeglass lens system as recited in claim 14 including a spring member coupled to said central support member and one of said clamp lug members.

16. The interchangeable eyeglass lens system as recited in claim 15 including a clamp lug actuating member coupled to one of said clamp lug members for pivotally displacing said clamp lug member about said central support member.

17. The interchangeable eyeglass lens system as recited in claim 16 wherein said clamp lug actuating member is positioned above said central support member.

18. The interchangeable eyeglass lens system as recited in claim 9 including at least two pairs of clamp lug members, each of said pairs of clamp lug members for individually grasping an individual lens of said eyeglasses.

19. The interchangeable eyeglass lens system as recited in claim 1 wherein said optical lens has first and second lens recesses formed therein and a central lens bridge formed thereon, said first and second lens recesses being removably received within said lens retaining lugs and said central lens bridge being removably received within said central support slot of said central support member.

* * * * *